3,490,336
MACHINE FOR PRECISION MACHINING AND
FINISHING THE SURFACES OF THE CAVITY
OF A DIE AND THE LIKE
Otto Staub, Lorrach, Germany, assignor to Markgräflich
Badische Industrieverwaltung GmbH & Co., Eimeldingen, Germany, a firm
Filed Oct. 2, 1967, Ser. No. 672,339
Int. Cl. B23d 1/18, 1/20
U.S. Cl. 90—24                                   28 Claims

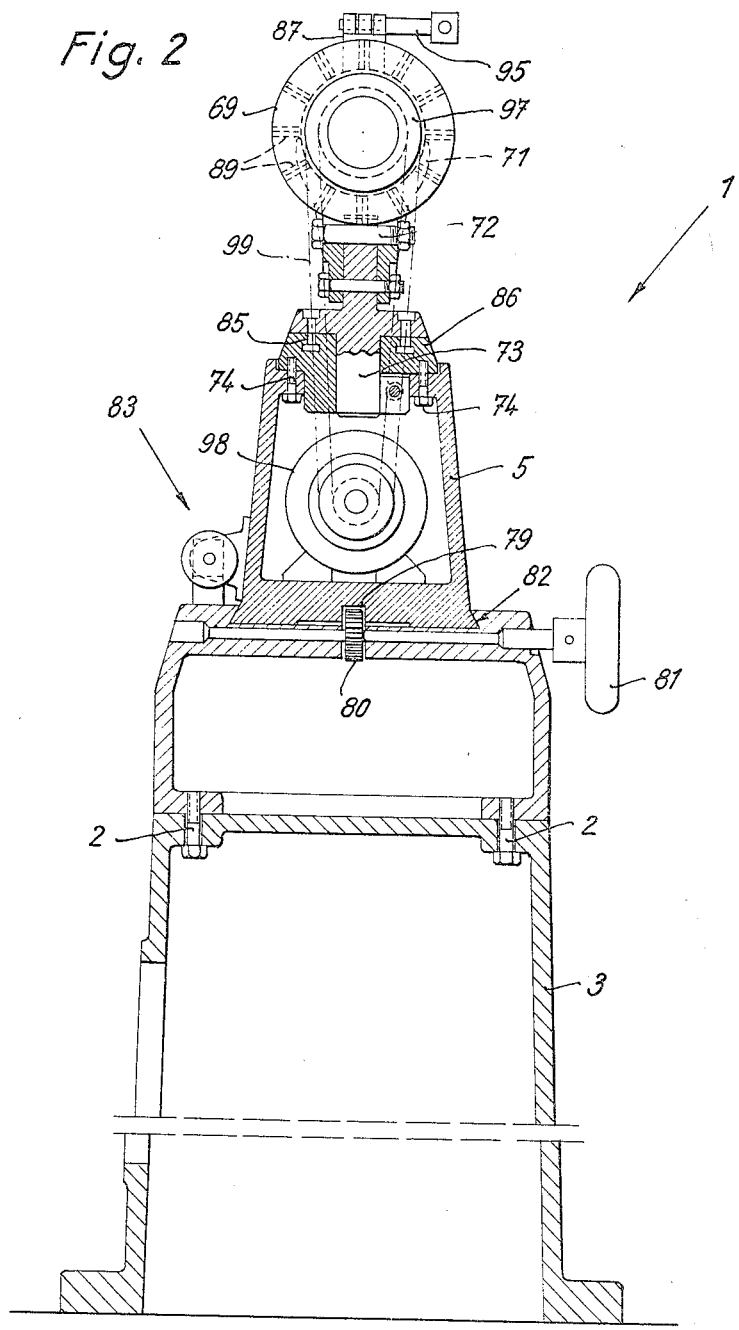

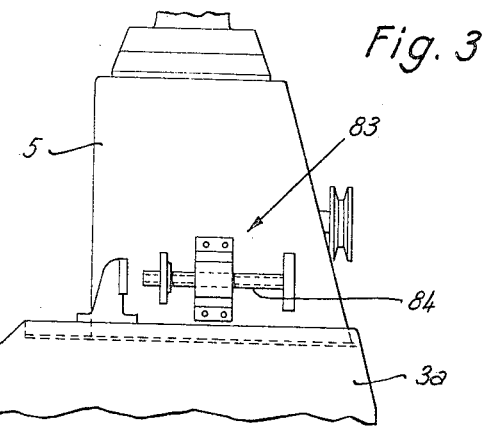
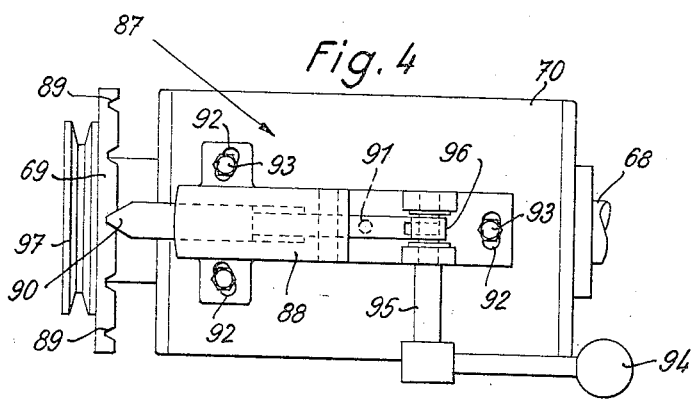
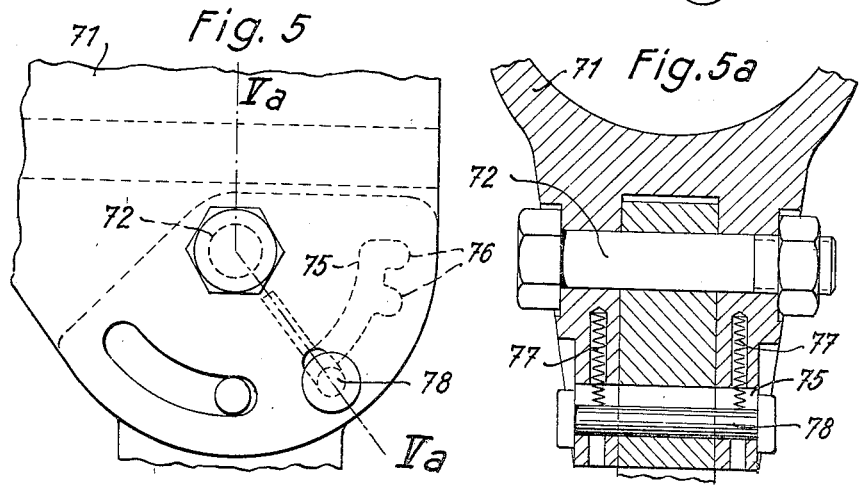

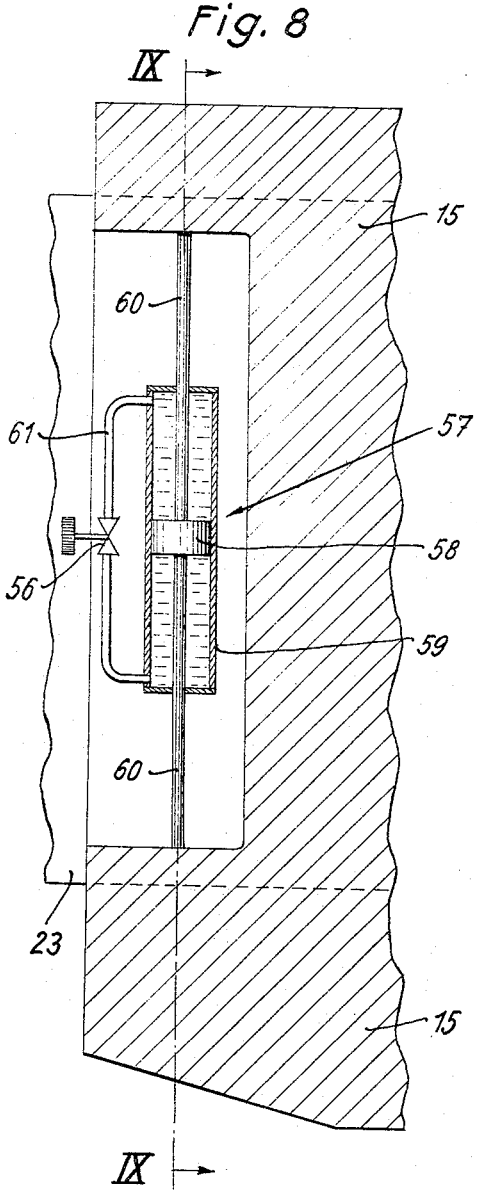
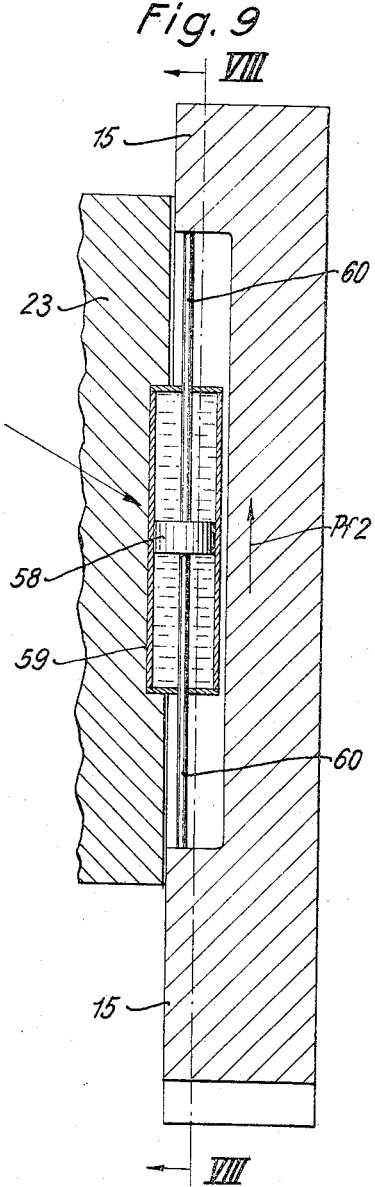

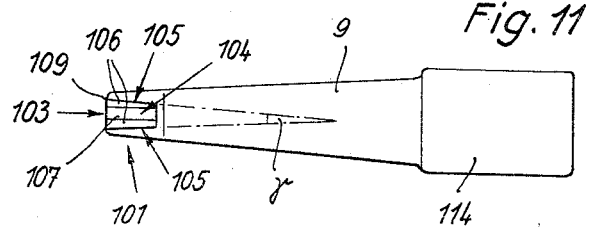
Fig. 11
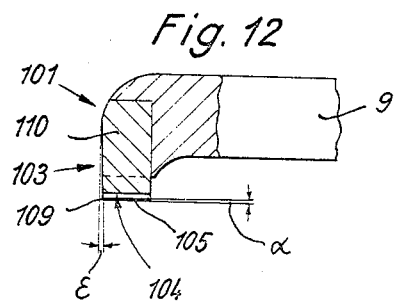
Fig. 12
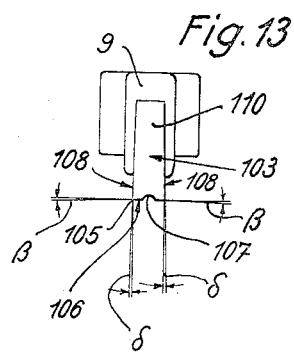
Fig. 13
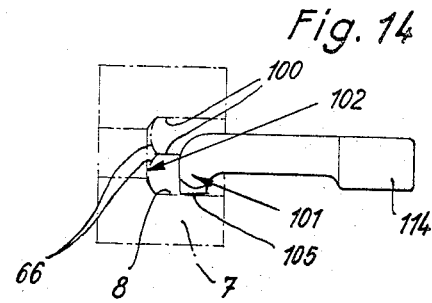
Fig. 14
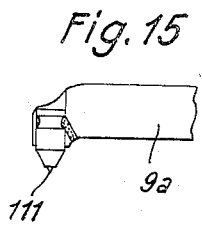
Fig. 15
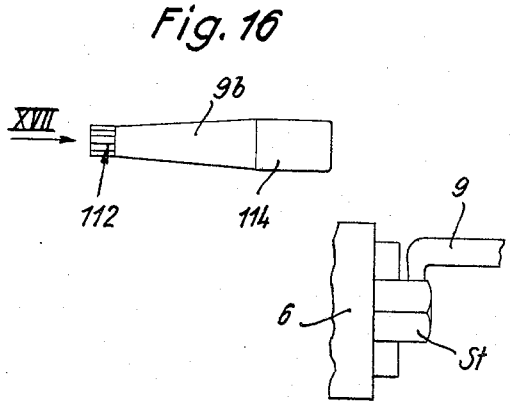
Fig. 16
Fig. 17
Fig. 18
INVENTOR,
OTTO STAUB
by Jacob L. Kalin
ATTORNEY United States Patent Office 3,490,336
Patented Jan. 20, 1970

ABSTRACT OF THE DISCLOSURE

A machine for precision machining and finishing the surfaces of a cavity in a die and possibly of a matching punch or the like for cold shaping the die is provided with a chuck which is rotatable about the longitudinal axis of a workpiece or of its internal cavity and arrestable in angular positions corresponding to the positions of the flat surfaces that are to be machined, and with a toolholder carrying a tool including cutters mounted to oscillate about an axis normal to the machined flat surface within a preadjustable lateral amplitude and associated with means for feeding the tool in the axial direction of said cavity.

BACKGROUND OF THE INVENTION

This invention relates to a machine for precision machining and finishing the surfaces of the cavity of a die, and possibly of a matching punch or the like for cold shaping the die, said surfaces being flat and extending axially of the die cavity or of the punch and forming an internal or external polygon with a transverse end surface adjoining the inner ends of said polygonal surfaces and facing the die opening in the form of a facetted floor, particularly for the purpose of producing nuts.

A known method of producing such dies for cold heading nuts comprises boring a hole into the die material and forcing a shaped punch into the hole. The forcing of the shaped punch into the round hole converts the latter into a hole of polygonal cross section. The defect of this method is that the punch entering the die material tends to tear parts of the material out of the side walls of the hole and that the result is an imprecise product of poor surface quality and a short working lift. Moreover, another drawback is that material dislodged from the side surfaces is pressed into the normally arched floor and thereby reduces its strength.

Better quality dies are usually produced by milling a polygonal cavity into the die material and then manually finishing the internal surfaces to the desired dimensions and surface quality, for instance by filing and polishing. In such dies it is important that the profile of the cavity is cut exactly symmetrically into the blank, a requirement which is difficult to fulfill by hand work and which therefore causes considerable expense. Moreover, in hand finishing the transitions between adjacent side faces as well as between the side faces and the floor tend to be rounded, although it is desirable that these corners should be sharp and well defined.

It has also been proposed to produce the inside faces of dies electrically by the spark erosion technique. A drawback of this process is the loss in hardness of the material due to the heat generated during the process of spark erosion, which affects the micro-structure of the material. This has the undesirable effect of reducing the life of a die that is thus produced. Moreover, finishing work is likewise still necessary.

SUMMARY OF THE INVENTION

It is the main object of the present invention to provide a machine which is suitable for precision machining and finishing the surfaces of a die cavity and possibly of a matching punch for cold shaping the die cavity, in such a way that manual finishing can be dispensed with.

In order to provide long lasting dies it is another object of the invention to produce the die cavity with a high degree of precision. In the machine proposed by the invention the working tool is therefore arranged to be very precisely adjustable and the motions of the tool are similarly precisely controllable to achieve the accuracy that is desired. Moreover, the contemplated machine is intended to be capable of removing material from the internal surface of the die for finishing the same without requiring a run-out for the tool, and it is proposed to design a tool to meet this requirement. In view of the need for exact symmetry of the die cavity and for high precision in the position and size of the individual surfaces, the objects of the invention also include the provision of facilities for accurately aligning the surfaces that are to be machined with the plane in which the tool works. In this connection it is desirable that the tool should be exchangeable for instance with another tool for final polishing without the accuracy of location of the machined surface being disturbed. Generally speaking, the purpose of the present invention substantially consists in substituting for the work of hand finishing a mechanical device which is so designed that it is capable of performing this work with great precision and of eliminating the need for hand finishing in the production of long lasting dies.

To attain these objects the present invention provides a machine of the above specified kind which comprises a chuck which is rotatable about the longitudinal axis of a workpiece or of its internal cavity and arrestable in angular positions corresponding to the angles of the flat surfaces that are to be machined, and toolholder carrying a tool including cutters mounted to oscillate about an axis normal to the machined flat surface within a preadjustable lateral amplitude and associated with means for feeding the tool in the axial direction of said cavity.

The tool which performs numerous exactly controlled and defined to and fro oscillatory swivel motions is thus capable of finishing a plane surface which is likewise precisely adjusted and aligned, and which is of a width corresponding to the amplitude of the oscillations performed by the tool. The use of such an oscillatory swivel motion for finishing internal surfaces also conveniently permits the surfaces of a die which are bounded by a facetted floor to be machined.

The drive means for generating the oscillatory swivel motions of the toolholder may be an eccentric or the like. Instead of an eccentric any alternative suitable means for the generation of oscillatory motion could be employed. Preferably the eccentricity of the drive means should be adjustable for the purpose of controllably varying the amplitude of the oscillatory motion of the tool.

The toolholder may be carried by a longitudinal slide mounted on a cross slide which is preferably tiltable about a horizontal axis. This arrangement augments the facilities available for adjusting the tool in relation to the work. The adjustability of the tool in relation to the work can be further improved by supporting the cross slide on one or more elevationally adjustable supports and by controlling its elevation with the aid of a handwheel or the like which is adapted to rotate one or more jacking screws through a gear wheel transmission.

For controlling the movement of the longitudinal slide an automatic servo motor may be provided which acts through a disengageable worm gear for generating a uniform and slow rate of infeed of the longitudinal slide. Worm gear is a suitable type of transmission for achieving a particularly uniform and slow rate of infeed so controlled that the largest possible number of lateral oscillations of the tool can be performed during the period of feeding the tool and the best possible finishing action on the machined surface obtained. The longitudinal slide may be associated with a limit switch which is precisely adjustable by coarse and fine thread adjusting means, said limit switch being adapted to stop the machine and possibly to switch on a signalling lamp when the cutter or tool has reached the end of its in-feeding travel at the facetted floor of the die. The provision of this limit switch thus permits the distance of infeerd to be predetermined with any desired degree of precision.

Preferably a rotatable chuck for the reception of the work, i.e., particularly of a die that is to be finish machined, is rotatably mounted on a spindle which at its rear end also carries a graduated indexing disc. The graduated disc permits the spindle to be conveniently indexed to bring each polygonal surface in turn into alignment with the machining tool.

Conveniently an arresting means for the graduated disc is adjustable and comprises a detent which is withdrawable from engagement with notches in the graduated disc in a guideway deflectable within limits and locatable on the spindle head in adjusted position in such a way that the point of engagement with the notches and the angular position of the chuck which is mounted on the same spindle as the graduated disc, and hence that of the workpiece in the chuck can be angularly adjusted in register with the oscilating plane of the tool. In other words, this arrangement also permits adjustment of the work so that a satisfactory relative alignment of the work with the likewise adjustable tool can always be effected.

In order to permit material to be removed from internal surfaces which are bounded by other internal surfaces extending at an angle thereto without the surfaces being damaged by chips, it is proposed by the invention to provide a cutting tool having a nose downwardly offset from the oscillating plane of the tool and formed with an underside which rises rearwardly away from the machined surface to form a front clearance angle, and which also rises away from the machined surface from each side cutting edge to provide side clearance angles together forming a V in such manner that the underside facing the machined surface forms an open V-section through. Consequently, the side cutting edges will primarily take effect in the forward region of the tool and the chips will be relatively thin. Conveniently the side faces which rise from the side cutting edges of the nose of the tool have a small back rake and thus form angles of less than 90° with the underside of the tool and the machined surface. This angle between the side faces and the underside is further reduced by the side clearance angle associated with each side cutting edge. The front clearance angle of the side cutting edges cause the latter to be effective principally at the forward end of the tool, the chips being principally raised by the two points formed between the underside, the nose face and the two side faces respectively.

A further improvement of the quality of the surface is obtained by polishing. For this purpose a polishing tool is conveniently used which has a nose with a face roughly corresponding to the surface that is to be polished, said face being provided with one or more groove-like recesses extending crosswise of the direction of oscillation of the tool for the reception therein of a grinding or polishing agent.

BRIEF DESCRIPTION OF THE DRAWINGS

FIG. 2 is a section taken on the line II—II in FIG. 1;

FIG. 3 is a side elevation of a pedestal portion which serves for supporting a spindle head carrying a chuck and a graduated indexing disc;

FIG. 4 is a plan view of adjustable arresting means for the graduated disc;

FIG. 5 is the tilting device for the spindle head containing the spindle carrying the graduated disc, shown on a larger scale;

FIG. 5a is a cross section taken on the line Va—Va in FIG. 5;

FIG. 8 is a detail marked E in FIG. 6, on a larger scale;

FIG. 9 is a section taken on the line IX—IX in FIG. 8;

FIG. 11 is a view of the underside of a tool;

FIG. 12 is a fragmentary section of the nose of a tool;

FIG. 13 is an end-on view of the nose of a tool;

FIG. 14 shows a tool in course of machining one of the inside surfaces of a die;

FIG. 15 is the end of a diamond-tipped tool;

FIG. 16 is a view of the underside of a polishing tool;

FIG. 17 is an end-on view of the polishing tool seen in the direction of the arrow XVII in FIG. 16, and FIG. 18 shows a tool polishing a polygonal face on a cold shaping punch.

DESCRIPTION OF THE PREFERRED EMBODIMENTS

Figure 1:
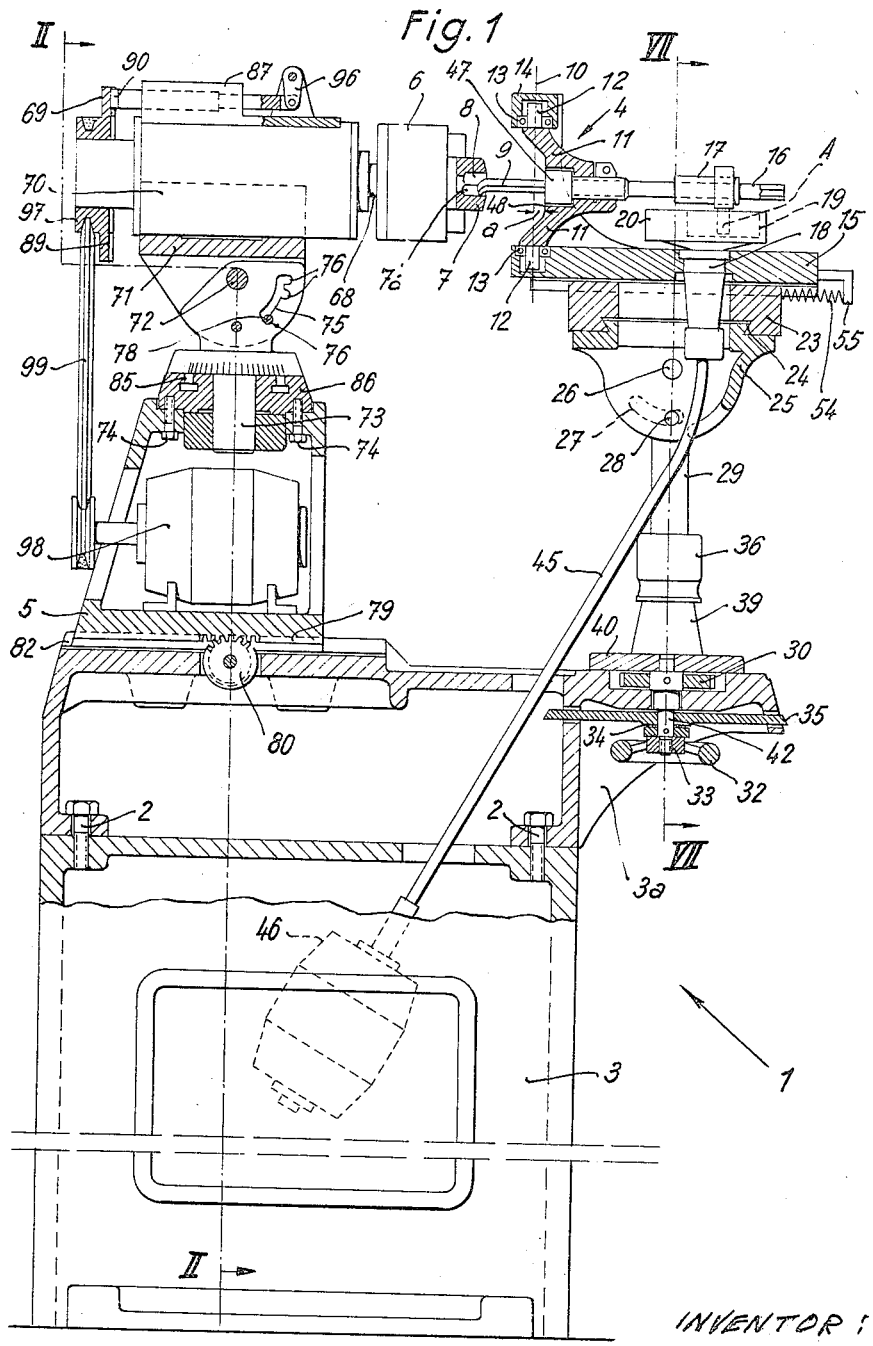
FIG. 1 is an elevational longitudinal section of an embodiment of the proposed machine.

The machine generally indicated by the reference numeral 1 for finishing the surfaces of a die cavity comprises a machine underframe 3 consisting of two parts connected together by screws 2. One side of the underframe 3 carries a toolholder 4 and associated elements for adjusting the same, whereas the other side of the underframe 3 carries a pedestal part 5 which primarily carries a chuck 6 for clamping up a workpiece 7. The kind of workpiece it is primarily intended to finish machine on the illustrated machine is a die to be used for the production of nuts in a cold heading press, the die comprising internal surfaces 8 forming a polygon, which are to be finish machined. Furthermore, the described machine 1 may also be used with advantage for machining a matching punch for cold forming the die cavity, so that good agreement between the surfaces of the punch and the die can be achieved. The purpose of the cold forming punch is to produce the die cavity by cold forming to a sufficient degree of precision to permit the same to be finish-machined in the machine 1. The cold working effect of the punch is an advantage, as is the fact that it can be produced by the same process and on the same machine 1 as the finished die, a circumstance which permits an excellent match between the cross section to be achieved.

The chuck 6 is indexable about the longitudinal axis of the workpiece 7 or of its cavity 7a and is locatable in angular positions corresponding to the angularities of the flat surfaces 8 that are to be machined. The toolholder 4 serves for holding a cutting or like tool 9 and is oscillatable within an adjustable angular amplitude about an axis 10 normal to the plane surface 8 that is to be machined and is provided with feed means operating axially of the die cavity 7a. The axis 10 is indicated in FIG. 1 by dot and dash lines and extends normal to one of the surfaces 8 of the workpiece 7.

The toolholder 4 has two arms 11 with pivot ends 12 mounted in two ball bearings 13. The ball bearings 13 are held in a yoke 14 on a longitudinally movable slide 15. The toolholder 4 is thus suited to perform swivel motions above the longitudinally movable slide 15 about the axis 10 indicated by the dot and dash lines.

In the illustrated embodiment the required oscillatory swivel motions are imparted to the toolholder 4 by an eccentric drive. However, it will be understood that, for instance, a crank motion might be used as an alternative. The illustrated toolholder 4 has a driving rod 16 which is of hollow construction to reduce inertial forces. This driving rod 16 carries a sliding sleeve 17 which is coupled to a circular sliding block 19 in a disc 20 revolving in a bearing 18. The sliding block 19 is eccentrically and rotatably located in the disc 20 and thus forms the above-mentioned eccentric drive. By reference more particularly to FIG. 6 it will be understood that the coupling point A of the sliding sleeve 17 with the circular sliding block 19 is eccentric in the block so that by rotation of the sliding block 19 in the disc 20 the eccentricity of the coupling point of the toolholder 4 and its driving rod 16 in relation to the center of rotation of the disc 20 is adjustable. The eccentricity of this coupling point A in relation to the axis of the bearing 18 of the disc determines the amplitude of the lateral to and fro motion of the toolholder 4. The circular sliding block 19 is adjustable by a screw 21 which is shown in chain lines in FIG. 6 which also discloses the provision of a set screw 22 which permits the circular sliding block 19 to be fixed in any desired angular position in the disc 20.

The longitudinally movable slide 15 which carries the toolholder 4 is mounted on a cross slide 23 which runs in ways 24 on a fixed base 25 for traverse normal to the workpiece axis. The base 25 is tiltably deflectable about a horizontal axis 26. Tilting of the base permits the angle of inclination of the machined surface 8 in relation to the workpiece axis 7 to be adjusted. Such an inclination of these surfaces is desirable in dies in order to facilitate the ejection of the finished part, such as a nut. The required very slight angle of inclination of the toolholder 4 is adjusted by a micrometer screw not specially shown. For precisely guiding the tilting motion a pin 28 is provided which slidably engages a slot 27 in a plate. The longitudinally movable slide 15, the cross slide 23 which is also tiltable about a horizontal axis and the adjustment of the amplitude of oscillation of the tool 9 by the eccentric drive together permit the tool 9 to be precisely adjusted with reference to a surface 8 that is to be machined.

Figure 7:
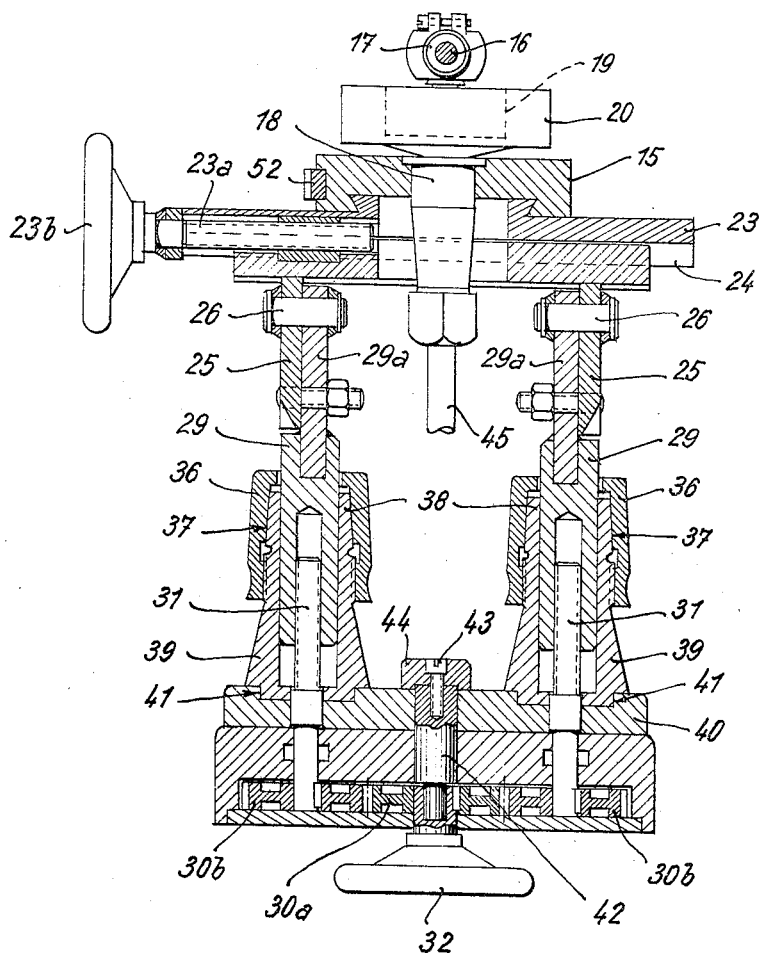
FIG. 7 is an elevational section taken on the line VII—VII in FIG. 1.

The adjustability of the tool is still further assisted by mounting the cross slide 23 on two elevationally adjustable columns 29 which can be raised and lowered by two jack screws 31 rotatable by a handwheel 32 and a gear transmission 30. With reference to FIG. 7 it will be seen that the handwheel 32 drives a central gear wheel 30a meshing with two gear wheels 30b which are each fast on one of the screws 31. More particularly with reference to FIG. 1 it will be understood that the gear transmission wheels are located in a projecting bracket 3a on the machine underframe, and that the handwheel 32 is conveniently accessible under the bracket. In the embodiment according to FIG. 1 the handwheel 32 can be coupled by thread means 33 and a clamping disc 34 to a graduated plate 35 not shown in FIG. 7.

When the handwheel 32 is rotated the two jack screws 31 which have a left-hand and right-hand thread respectively likewise rotate and raise the supporting columns 29. For locating the columns 29 tubular caps 36 are provided which have an internal taper 37. When the tubular caps 36 are screwed down their internal taper 37 rides onto a co-operated external taper 38 on sleeves 39 in which the columns 29 are slidably guided. The sleeves 39 are compressed and thus grip the columns 29 tightly (cf. FIG. 7). The sleeves 39 rest on a baseplate 40 where they are located by engaging recesses 41 in the baseplate 40. The baseplate 40 also carries the handwheel shaft 42 which has an end plate 44 detachably affixed thereto by means of a screw 43 and adapted to bear on the surface of the baseplate 40.

FIG. 7 also shows the base 25 and the horizontal axis 26 about which the base 25 is tiltable in relation to an extension 29a of the column 29. Moreover, the pins 28 constituted by bolts are likewise shown.

Again referring to FIG. 1 it will be seen that the driving disc 20 is connected to a motor 46 by a flexible shaft 45. The motor 46 is so disposed that the flexible shaft 45 is subject to minimum flexural strain when the longitudinally movable slide 15 and the cross slide 23 are in their extreme end positions. The speed of the motor is variable within a very wide range, for instance between 100 and 4,000 r.p.m.

According to a particular feature of the invention the toolholder 4 is so designed that the point where the tool 9 is received into its socket 47 is offset from the swivel axis 10 of the holder in a direction away from the workpiece by an amount a. Particularly when short tools are used this offset a is useful, since otherwise there would be some risk of the toolholder 4 during its oscillatory motion fouling the workpiece 8 or its support means. For determining the radius of action of the oscillatory tool measured from the swivel axis of the toolholder to the nose of the cutter, the toolholder 4 is provided with a reference abutment face 48. This may be contained in the swivel axis 10 itself or, as shown in the illustrated embodiment, it may be rearwardly offset therefrom by a precisely known distance.

Figure 6:
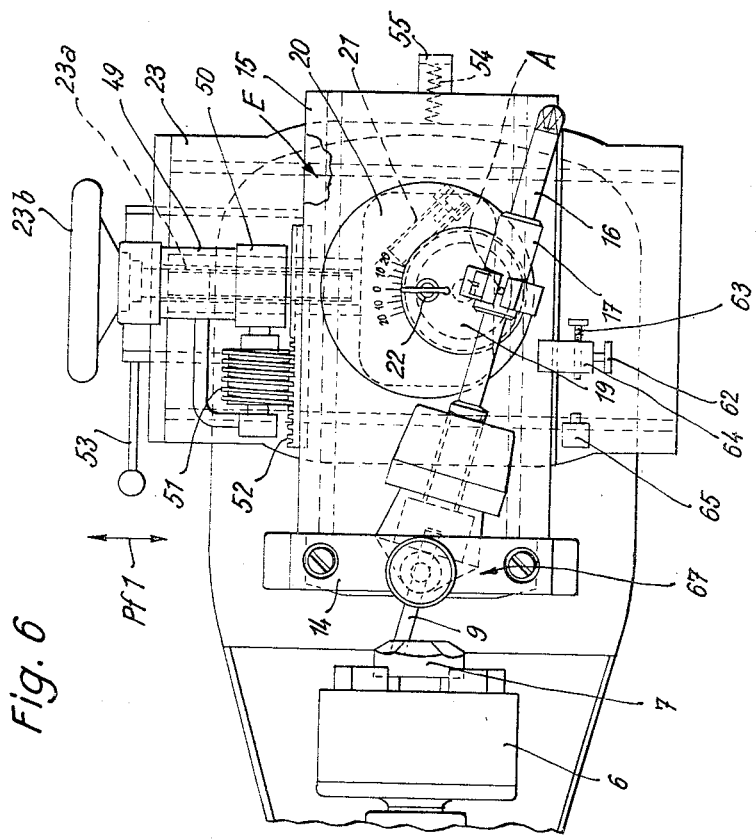
FIG. 6 is a plan view of part of the machine comprising the toolholder and the elements supporting the toolholder.

With reference to FIGS. 6 and 7 the cross slide 23 is seen to be traversible by means of a feed screw 23a and a handwheel 23b. A graduated disc with a vernier may also be associated with this handwheel 23b, although this is not shown in the drawings for the sake of greater simplicity.

The movement of the longitudinally movable slide 15 which controls the tool feed is effected by a special servomotor 49. This servo motor drives the slide 15 through a reduction gearing 50 and a worm 51 which in driving position as shown in FIG. 6 engages a rack 52 on the longitudinally movable slide 15. This arrangement provides an automatic and uniform slow rate of infeed of the longitudinally movable slide 16 and a large number of oscillations of the tool 9 can therefore take place within a short distance of forward feed. The surface 8 can thus be machined with great precision. The infeed drive comprising the servomotor 49, the reduction gearing 50 and the worm 51 is disengageable from the rack 52 by operation of a handle 53. The direction of operation of the handle 53 for engaging and disengaging the drive is indicated by a double-headed arrow Pf1 in FIG. 6. The reduction ratio of the gearing is preferably so chosen and related to the motions of the tool that the latter will perform about 350 oscillations in the course of each millimeter of infeed.

FIGS. 1 and 6 show the provision of a compression spring 54 at the end of the longitudinally movable slide 15 which spring is gradually energized as the longitudinally movable slide 15 moves towards the workpiece 7. The in-feeding motion of the longitudinally movable slide 15 thus proceeds against the resistance of this spring 54 which withdraws the slide 15 when the drive is disengaged as described. One end of the compression spring 54 bears against the cross slide 23, whereas the other end bears against a bracket 55 projecting from the longitudinally movable slide 15. For retarding the return motion of the longitudinally movable slide 15 a hydraulic brake 57 which is controllably adjustably by a valve 56 is provided. The motion of the tool during the return of the slide 15 can thus be used for repolishing the surface which had been machined during the in-feeding motion.

FIGS. 8 and 9 illustrate the hydraulic brake 57 comprising a piston 58 in a cylinder 59. The cylinder 59 may be rigidly affixed to the cross slide 23 and the piston 58 may be connected by one or two piston rods 60 to the longitudinally movable slide 15. Conversely, the cylinder 59 could be connected to the longitudinally movable slide 15 and the piston to the cross slide 23. When the slide 15 moves on the cross slide 23, particularly in the direction Pf2 which corresponds to the return of the slide 15, a fluid contained in the cylinder 59 is displaced through a by-pass 61 containing the valve 56 from one side of the piston to the other. The resistance to displacement offered by the fluid and hence the braking effect can be controlled by adjusting the valve 56 to a desired cross section of flow. The co-operation of the spring 54 and of the hydraulic brake 57 thus provides a convenient facility for reducing the speed of return during which the tool 9 can once more sweep across the entire previously machined surface 8 for the purpose of giving the same a finishing polish. If desired, a polishing paste may be introduced into a groove 107 in the tool 9.

In FIG. 6 a stop 64 of which the position in relation to the longitudinally movable slide 15 is coarsely adjustable by a control knob 62 and finely controllable by a micrometer thread 63 is provided on the slide 15 or on the cross slide 23 for co-operation with a limit switch 65. This limit switch 65 may be adapted to stop the machine 1 and possibly to switch on a signalling lamp when the tool 9 has completed the prescribed distance of in-feed, for instance to the edge of an arched floor 66 at the bottom of the die cavity 7a. The in-feed can thus be preselected by the precise adjustment of the stop 64 in such manner that a surface 8 is machined precisely to its end where it adjoins the floor 66 of the die, and no further.

It should be noted that the yoke 14 in which the arms 11 of the toolholder 4 are mounted is provided with means 67 for affixing a polishing or milling attachment thereto. For instance, the end face of a cold shaping punch which is intended to form the floor 66 of the die during its production by cold flowing may be polished and machined with the aid of such an attachment.

The chuck 6 of the machine 1 is mounted on the end of a rotatable spindle 68. The rear end of the spindle 68 carries a graduated index plate 69. The spindle 68 is contained in a spindle head 70 which is partly embraced from below by a trough-shaped support 71. The spindle head 70 and the support 71 are tiltable about a horizontal shaft 72 and deflectable about a vertical shaft 73, means being provided for arresting the spindle head 70 in any desired angular position. It will be seen in the drawing that the bearings of the shaft 73 and the support 71 are detachably affixed to the pedestal part 5 of the underframe by screws 74. For locating the spindle head 70 in preferred positions of inclination a slot 75 is provided with notches 76 for co-operation with a catch 78 loaded by compression springs 77. This facility permits the spindle head 70 to be located in preferred positions of inclination quickly and without effort (FIGS. 5 and 5a).

Further with reference to FIGS. 1 and 2 it will be observed that the pedestal part 5 which carries the chuck 6 and the index plate 69 is longitudinally movable on the machine underframe 3 by means of a pinion 80 which engages a rack 79 affixed to the pedestal, said pinion 80, as shown in FIG. 2, being rotatable by a handwheel 81. Moreover, the handwheel 81 permits the pedestal part 5 to be arrested in any position in its ways 82. According to FIG. 3 an adjustable stop 83 permits the pedesetal part 5 to be returned into a precisely predetermined starting position before it is longitudinally moved. The stop 83 is adjustable by means of a screw 84.

The longitudinal displaceability of the pedestal part 5 has the advantage that by withdrawing the same easy access can be gained to the tool 9 and the toolholder 4 from the working face side without the necessity of having to remove the workpiece 7 from its preadjusted position in the chuck, since the chuck can be easily restored to its former position.

The spindle head 70 can be located in any position of deflection about the shaft 73 by tightening T-section blocks in an annular slot 85 by means of clamping screws and by thus pressing the support 71 tightly onto its bearing 86.

FIGS. 1 and 4 also show locking means 87 associated with the graduated plate 69 which according to a special feature of the invention also serves as an indexing means inasmuch as the guideway 88 of a detent 90 adapted to engage notches 89 in the back of the plate can be slightly deflected and fixed in relation to the longitudinal axis of the spindle head 70 in such manner that the point of engagement and hence the chuck 6 which is mounted on the same shaft 68 as the graduated plate 69 can be adjusted to bring the workpiece 7 in the chuck 6 into register with the oscillating plane of the tool. The guideway 88 is thus deflectable about a fulcrum at 91, and it is locatable on the spindle head 70 by means of screws 93 which engage elongated holes 92. Engagement and disengagement of the detent 90 is effected by a lever handle 94, the deflections of this lever handle 94 being transmitted by a lever arm 95 and converted by a cam 96 into to and fro motions of the detent 90. It may be mentioned that engagement of the detent 90 with a notch 89 could be effected by a compression spring, not shown, which opposes the motion of the lever handle 94 during the disengaging motion. In a manner which is known in the art and not therefore specially illustrated the lever handle 94 is arrestable in its two end positions.

In order to permit the end face, which is to form the floor of the die, of the previously mentioned cold shaping punch to be machined in the chuck 6, the spindle shaft 68 is also provided with a pulley 97 which can be driven by a belt 99 or other transmission means from a motor 98 mounted inside the longitudinally slidable pedestal 5. After disengagement of the detent 90 the left-hand part of the machine 1 in FIG. 1 can then be operated by the motor 98 like a lathe or grinding bench.

The above-described machine 1 can be used and operated as will now be described:

The workpiece 7, such as for example the die shown but not indicated by a special reference numeral in FIG. 14 which is intended for the production of nuts by cold heading, is prefabricated on conventional machines until the internal polygonal surfaces 100 are within a few tenths of a millimeter of the required dimensions. This workpiece 7 is then clamped up in the chuck 6 and at the same time a tool 9 is fixed in the toolholder 4. Conveniently the radius between the nose 101 of the tool 9 and the swivel axis 10 of the toolholder 4 is adjusted so that it is equal to the radius of curvature 102 of the ends of the surfaces 8 that are to be finish machined (FIGS. 1 and 14). The presence of the reference abutment face 48 on the toolholder 4 facilitates the desired adjustment.

The lateral deflection of the nose 101 of the tool during the oscillatory swivel motion must correspond to the width of the machined surface 8 and can be adjusted by appropriately selecting the eccentricity of the drive by rotatable adjustment of the circular sliding block 19. The machining of the surface 8 with the tool 9 can then begin, the serve motor 49 providing the necessary in-feed of the longitudinally movable slide 15. The limit switch 65 stops the motor 49 when the adjustable stop 64 on the slide 15 trips the switch 65. During this operation a few hundredths up to a few tenths of a millimeter are removed from the surface 8 of the workpiece 7 that is being machined. The described machining operation is therefore capable of replacing the hand finishing work. At the same time the advantage is gained that the surfaces 8 are machined in such a way that the edges form exactly symmetrical outlines. Moreover, the tool 9 will exactly machine up to the inner ends of the surfaces 8, which are indicated in FIG. 14 by the contour line 102.

The graduated plate 69 has the advantage that only one of the machined surfaces 8 need be initially adjusted to register with the oscillating plane of the tool, since the other surfaces follow at equal angles and can therefore be brought into register merely by indexing the index plate 69 and the chuck 6. In other words, when one of the surfaces 8 has been finished, the chuck 6 and the index plate 69 need merely be indexed through an angle which is equal to the internal angle between consecutive surfaces of the polygonal cavity, machining being thus continued until all the surfaces have been finished.

For the purpose of permitting the machine 1 to be used for the production of bevel edges on a matching punch, provision is made in the machine 1, as has been described, for mounting, for instance on the longitudinally movable slide, a grinding or milling attachment of conventional kind. To this end, as well as for machining bevels on the workpiece 7, the spindle head 70 and the vertical shaft 73 may be rotated into the angle of the bevel face. It is a considerable convenience that it is possible to produce a shaped punch in the same chuck 6 and with the aid of the same index plate 69 as a die, since this ensures a particularly satisfactory match of such a punch with the cavity 7a of the die 7.

A factor of major importance for ensuring satisfactory functioning of the machine 1 is the design of the tool 9, particularly of its cutting nose 101. According to a special feature of the invention the cutting nose 101 which is bent downwards out of the oscillating plane towards the machined surface 8 has an underface 104 which rises from the end face 103 of the nose 101 rearwardly away from the machined surface 8, thereby providing a front clearance angle $\alpha$, and which also rises inwards from each of the two side edges 105 to form side clearance angles $\beta$ which together generate an open V-section above the machined surface 8. Roughly in the middle of the underside 104 formed by two component faces 106 forming the V is a recess 107 resembling a groove extending in the longitudinal direction of the tool, as will be seen more particularly in FIGS. 10, 11 and 13, said groove inwardly bounding and separating the two said component faces 106. The side clearance angle $\beta$ represents the angle of inclination of each of the component faces 106 in relation to a single plane face. In an advantageous manner the groove-like recess 107 is capable of receiving for instance small chips or the like, preventing these from scoring or scratching the machined surface 8. Moreover, the presence of the groove-like recess 107 permits an oilstone or the like to be applied for honing either of the component faces 106 without touching and damaging the other.

Figure 10:
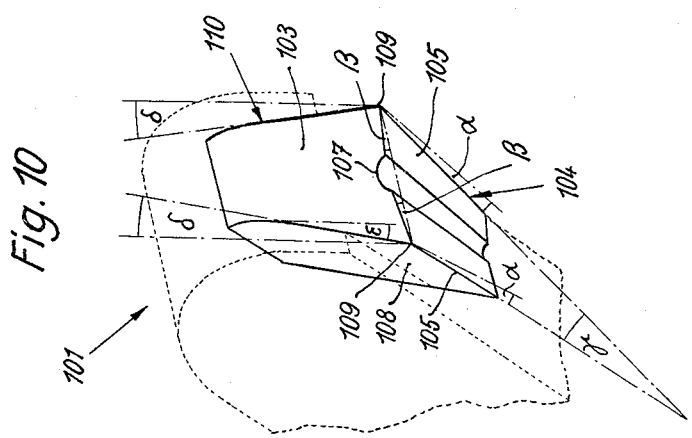
FIG. 10 is a perspective view of the nose of a cutter used as a machining tool, shown on a considerably larger scale.

From FIGS. 10 and 11 it will also be understood that the cutting side edges 105 of the underside 104 form a small side cutting edge angle $\gamma$ which opens towards the end face 103 of the tool nose 101. Furthermore, the side faces 108 of the tool nose 101 which rise from the side cutting edges 105 have a small back rake $\delta$, and they therefore make an angle of less than 90° with the underside of the tool and with the surface that is to be machined. This improves the cutting action of the side edges 105. Moreover, the front clearance angle $\alpha$, the side cutting edge angle $\gamma$, the back rake $\delta$, and the side clearance angles $\beta$ at the nose end face of the side edges 105 co-operate to create a sharp point 109 which is capable of raising fine chips during the slow rate of in-feed in a very desirable manner.

The end face 103 of the tool rises from the underside 104 with a slight forward rake $\epsilon$. This forward rake of the end face 103 prevents the transmission of a component of thrust to the machined surface when the end of the tool contacts the concave floor 66 of the die at the inner end of the machined surfaces 8.

It should be mentioned that the cutting point 109 in conjunction with the precise adjustability of the limit switch 65 and of the radius of action and amplitude of the oscillating tool permit the surfaces 8 to be machined by the tool 9 despite the fact that the surfaces 8 offer no run-out for the tool. It has been found that the edges between adjacent surfaces 8 and between these surfaces and the floor of the cavity are sharply and accurately formed.

It is preferred that the front clearance angle $\alpha$ and the back rake $\delta$ should each be about half a degree when the side clearance angles $\beta$ forming the V are slightly less than half a degree, the forward rake $\epsilon$ of the nose is about 2° and the side cutting edge angle $\gamma$ is about 3°. In the illustrated embodiment the nose end of the tool is shown to contain a hard metal tip 110 which has the above-described raking faces and tool angles.

When the machining operation with the above-described cutting tool has been completed the workpiece can be hardened. A fresh finishing operation may follow. For this latter purpose the tool employed may be a diamond-tipped tool 9a with a diamond holder 111 soldered into a hole in the end of the shaft, as shown in FIG. 15.

For improving the quality of the surfaces 8 these may be polished. FIGS. 16 and 17 illustrate a polishing tool 9b provided with a polishing face 112 at the end of the tool roughly corresponding to the plane of the machined surface and having two groove-like recesses 113 extending crosswise of the oscillating motion of the tool for the reception of grinding and polishing agents. FIGS. 11 and 16 clearly show the tang 114 of the tool.

The proposed machine 1 permits the internal cavity of a die for cold heading nuts to be so precisely machined that the life of such a die is substantially better than that of dies produced by conventional methods. In a particularly advantageous way manual finishing, which largely depends upon the skill of the individual worker, is replaced by accurately controllable machining and the precision of the die can thus be kept within very narrow tolerations. Another advantage is that the machine is relatively easy to set up and control, whereas hand finishing of such a die is an operation that can be performed with adequate accuracy only by highly qualified personnel. It should be mentioned that the features which are disclosed in the drawings and in the above detailed description may be essential to the invention severally or in any combination. More particularly, the combination of the several features as described with reference to the illustrated embodiment provides a machine which affords the above-mentioned advantages in a particularly satisfactory manner.

FIG. 18 schematically shows the manner in which the side faces of a profiled punch St gripped in the chuck 6 can be machined by means of a tool 9.

While various changes may be made in the detail construction, it is understood that such changes will be within the spirit and scope of the present invention.

What is claimed is:

1. A machine for precision machining flat axially extending surfaces of a workpiece comprising a machine frame, a chuck mounted for rotation about its axis and supported by said frame for holding said workpiece, indexing means for positioning said chuck in angular positions corresponding to the positions of said flat surfaces to be machined, a tool holder carrying a cutting tool supported by said frame, means for oscillating said tool holder about an axis normal to said chuck axis, means for limiting said oscillations to a preadjustable lateral amplitude, and means for feeding the tool-holder in the axial direction of said chuck during the oscillations.

2. A machine according to claim , wherein said means for oscillating the toolholder includes an eccentric member.

3. A machine according to claim 1, wherein said means for oscillating said toolholder includes a driving rod carrying a sliding sleeve coupled by a rotary bearing and a circular sliding block to a driving disc.

4. A machine according to claim 3, wherein said means for limiting said oscillations includes a screw provided on the driving disc which tangentially engages the circular sliding block for rotatably adjusting the same end a clamping screw on the driving disc is provided for locking the circular sliding block in place.

5. A machine according to claim 4, wherein the circular sliding block is eccentrically located in the driving disc to permit variations of the eccentricity of the coupling point of the toolholder with respect to the axis of the driving disc.

6. A machine according to claim 1, wherin the means for feeding the toolholder includes a longitudinally movable slide mounted on a cross slide which is tiltable about a horizontal axis.

7. A machine according to claim 1, wherein the point where the cutting tool emerges from the toolholder socket is set back from the toolholder oscillation axis in a direction away from the workpiece.

8. A machine according to claim 5, wherein the cross slide is mounted on at least one elevationally adjustable support and the required adjustment for height is effected by a handwheel and gear transmission for rotating at least one jacking screw.

9. A machine according to claim 5, wherein the driving disc containing the eccentric circular sliding block is drivable by a motor through a flexible shaft.

10. A machine according to claim 1, wherein the toolholder is provided with a reference abutment face for determining the radius of action of the oscillating tool measured between a nose on the cutting tool and the oscillation axis of the toolholder.

11. A machine according to claim 6, wherein said feeding means further includes an automatic servomotor acting througfh a disengageable worm gearing which is provided for imparting a uniform slow rate of in-feed of the longitudinally movable slide.

12. A machine according to claim 11, wherein the in-feed of the longitudinally movable slide proceeds against the resistance of a restoring spring which is provided for effecting the return of said slide when the in-feed drive is disengaged.

13. A machine according to claim 6, wherein a hydraulic brake controlled by a valve is provided for slowing down the return motion of the longitudinally movable slide to permit the return motion of the tool to be utilized for polishing the machined surface.

14. A machine according to claim 6, wherein the longitudinally movable slide is provided with a stop adjustable by a handwheel and a micrometer thread for operating a limit switch which switches off the machine when the in-feeding tool has reached the end of its required in-feeding motion.

15. A machine according to claim 1, wherein a yoke mounts the toolholder on said frame.

16. A machine according to claim 1, wherein said indexing means comprises the chuck being mounted on one end of a rotatable spindle and a graduated index plate at the other end thereof.

17. A machine according to claim 16, wherein the chuck and the graduated index plate are supported by a pedestal part that is longitudinally displaceable by means of a pinion engaging a rack on the pedestal part and fixable in a slideway provided with an adjustable stop for returning the pedestal part to a prescribed starting position prior to its longitudinal displacement.

18. A machine according to claim 16, wherein a spindle head contains the spindle and is rotatable and fixable about a horizontal axis as well as about a vertical axis.

19. A machine according to claim 18, wherein said indexing means include a spring-loaded detent member which is provided for co-operating with notches in said index plate.

20. A machine according to claim 16, wherein adjustable locking means for the graduated index plate are provided which comprise a detent withdrawable from engagement with notches in the graduated index plate, in a guideway which is deflectable within limits and locatable in adjusted positions on a spindle head containing the spindle, in such manner that the point of engagement with the notches and hence the angular position of the chuck mounted on the same spindle shaft as the graduated index plate and of the workpiece in the chuck are angularly adjustable into register with the oscillating plane of the tool.

21. A machine according to claim 20, wherein the spindle shaft is provided with a driving pulley drivable by a belt from a motor mounted in a longitudinally slidable pedestal part.

22. A machine according to claim 1, wherein the cutting tool which is provided for machining the workpiece surfaces has a nose downwardly offset from the oscillating plane and formed with an underside which rises rearwardly away from the machined surface to form a front clearance angle $\alpha$ and which also rises away from the machined surface from each side cutting edge to provide side clearance angles $\beta$ together forming a V in such manner that the underside facing the machined surface forms an open V section trough.

23. A machine according to claim 22, wherein the side cutting edges on the tool underside include a small side cutting edge angle $\gamma$ which has its vertex rearwardly of the tool.

24. A machine according to claim 22, wherein the nose has side faces which rise from the side cutting edges of the tool nose have a small back rake $\delta$ and therefore form an angle which is less than 90° with the underside of the tool and the machined surface.

25. A machine according to claim 22, wherein the front end face of the tool rises from the front edge of the underside with a forward rake $\epsilon$.

26. A machine according to claim 22, wherein the front clearance angle $\alpha$ and the back rake $\delta$ are each half a degree, the side clearance angles $\beta$ forming the V are less than half a degree and the forward rake $\epsilon$ is about two degrees and the side cutting edge angle $\gamma$ about three degrees.

27. A machine according to claim 22, wherein the front end face of the tool is provided with a hard metal tip.

28. A machine according to claim 22, wherein the cutting tool is a diamond-tipped tool.

References Cited

UNITED STATES PATENTS

| | | | |
|---|---|---|---|
| 1,148,065 | 7/1915 | Warren | 90—24 |
| 1,803,429 | 5/1931 | Gunning | 51—58 X |
| 2,633,675 | 4/1953 | Ellis | 51—55 X |

ANDREW R. JUHASZ, Primary Examiner

GIL WEIDENFELD, Assistant Examiner

U.S. Cl. X.R.

90—38, 56; 82—18